(12) United States Patent
Ishiguro et al.

(10) Patent No.: US 6,501,566 B1
(45) Date of Patent: Dec. 31, 2002

(54) IMAGE PROCESSING APPARATUS CARRYING OUT MULTI-VALUE ERROR DIFFUSION PROCESS

(75) Inventors: Kazuhiro Ishiguro, Toyokawa (JP); Kaoru Tada, Aichi-Ken (JP); Soh Hirota, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/050,905

(22) Filed: Mar. 31, 1998

(30) Foreign Application Priority Data

Apr. 3, 1977 (JP) .............................. 9-084877

(51) Int. Cl.[7] .................. H04N 1/40; H04N 1/409; G06K 15/02; G06T 5/00
(52) U.S. Cl. .................. 358/3.05; 358/3.26; 382/252; 382/275
(58) Field of Search .................. 358/1.9, 1.8, 455, 358/466, 298, 3.05, 3.04, 3.03, 3.26; 382/272, 169, 237, 252, 275

(56) References Cited

U.S. PATENT DOCUMENTS

| | | | | |
|---|---|---|---|---|
| 4,975,786 A | * | 12/1990 | Katayama et al. | 358/3.05 |
| 5,086,484 A | * | 2/1992 | Katayama et al. | 382/252 |
| 5,245,678 A | * | 9/1993 | Eschbach et al. | 358/3.05 |
| 5,553,166 A | * | 9/1996 | Kakutani | 382/252 |
| 5,724,444 A | * | 3/1998 | Yamanishi et al. | 358/1.9 |
| 5,737,453 A | * | 4/1998 | Ostromoukhov | 358/3.03 |
| 5,748,794 A | * | 5/1998 | Maeda et al. | 382/272 |
| 5,768,441 A | * | 6/1998 | Yoshizawa et al. | 382/237 |
| 5,848,183 A | * | 12/1998 | Farrell et al. | 358/466 |
| 6,091,858 A | * | 7/2000 | Yoshida | 358/3.05 |
| 6,233,360 B1 | * | 5/2001 | Metcalfe et al. | 382/252 |
| 6,292,268 B1 | * | 9/2001 | Hirota et al. | 358/3.03 |

FOREIGN PATENT DOCUMENTS

| JP | 63-174186 | 7/1988 |
|---|---|---|
| JP | 4-2271 | 1/1992 |

* cited by examiner

Primary Examiner—Scott Rogers
(74) Attorney, Agent, or Firm—Burns, Doane, Swecker & Mathis, LLP (57) ABSTRACT

An image processing apparatus that can carry out an error diffusion process without degrading the quality of image data generates a density histogram according to pixels included in the input image data. Reference densities S1 and S2 are calculated from pixels having a certain density in a set range. Threshold values T1–T3 are calculated according to the obtained reference densities S1 and S2.

24 Claims, 13 Drawing Sheets

|  | S0=0 ↓ | T1 ↓ S1=85 | T2 ↓ S2=170 | T3 ↓ S3=255 |
|---|---|---|---|---|
| CORRECTED PIXEL DENSITY OF PIXEL OF INTEREST D' | 0 ~ 41 | 42 ~ 126 | 127 ~ 211 | 212 ~ 255 |
| CONVERTED PIXEL DENSITY P | "00" | "01" | "10" | "11" |
| DATA SELECTOR SEL OUTPUT Ti | 0 | 85 | 170 | 255 |
| ERROR E | D' - 0 | D' - 85 | D' - 170 | D' - 255 |

FIG. 10 RELATED ART

FIG. 11A RELATED ART
INPUT IMAGE
DENSITY OF ONE PIXEL D

FIG. 11B RELATED ART
ERROR MEMORY 35
DENSITY OF ONE PIXEL R

FIG. 11C RELATED ART
OUTPUT FROM ADDER 31
DENSITY OF ONE PIXEL D'

| CORRECTED PIXEL DENSITY OF PIXEL OF INTEREST D' | 0 ~ 63 | 64 ~ 127 | 128 ~ 191 | 192 ~ 255 |
|---|---|---|---|---|
| CONVERTED PIXEL DENSITY P | "00" | "01" | "10" | "11" |
| DATA SELECTOR SEL OUTPUT Ti | "0" | "64" | "128" | "192" |
| ERROR E | D' - 0 | D' - 64 | D' - 128 | D' - 192 |

FIG. 14 RELATED ART

|  |  | * | (2/6)E |  |
|---|---|---|---|---|
|  | (1/6)E | (2/6)E | (1/6)E |  |
|  |  |  |  |  |

IMAGE PROCESSING APPARATUS CARRYING OUT MULTI-VALUE ERROR DIFFUSION PROCESS

BACKGROUND OF THE INVENTION

1. Field of the Invention

The present invention relates to image processing apparatuses, and more particularly to an image processing apparatus employing a multi-value error diffusion process.

2. Description of the Related Art

This application is based on Japanese Patent Application No. 9-084877 filed in Japan, the contents of which are hereby incorporated by reference.

In the field of the image processing apparatus employing the conventional multi-value error diffusion system, the art of comparing image data with a plurality of threshold values to generate output data of a plurality of bits corresponding to the comparison result is proposed as disclosed in, for example, Japanese Patent Laying-Open No. 4-2271.

Figure 10:
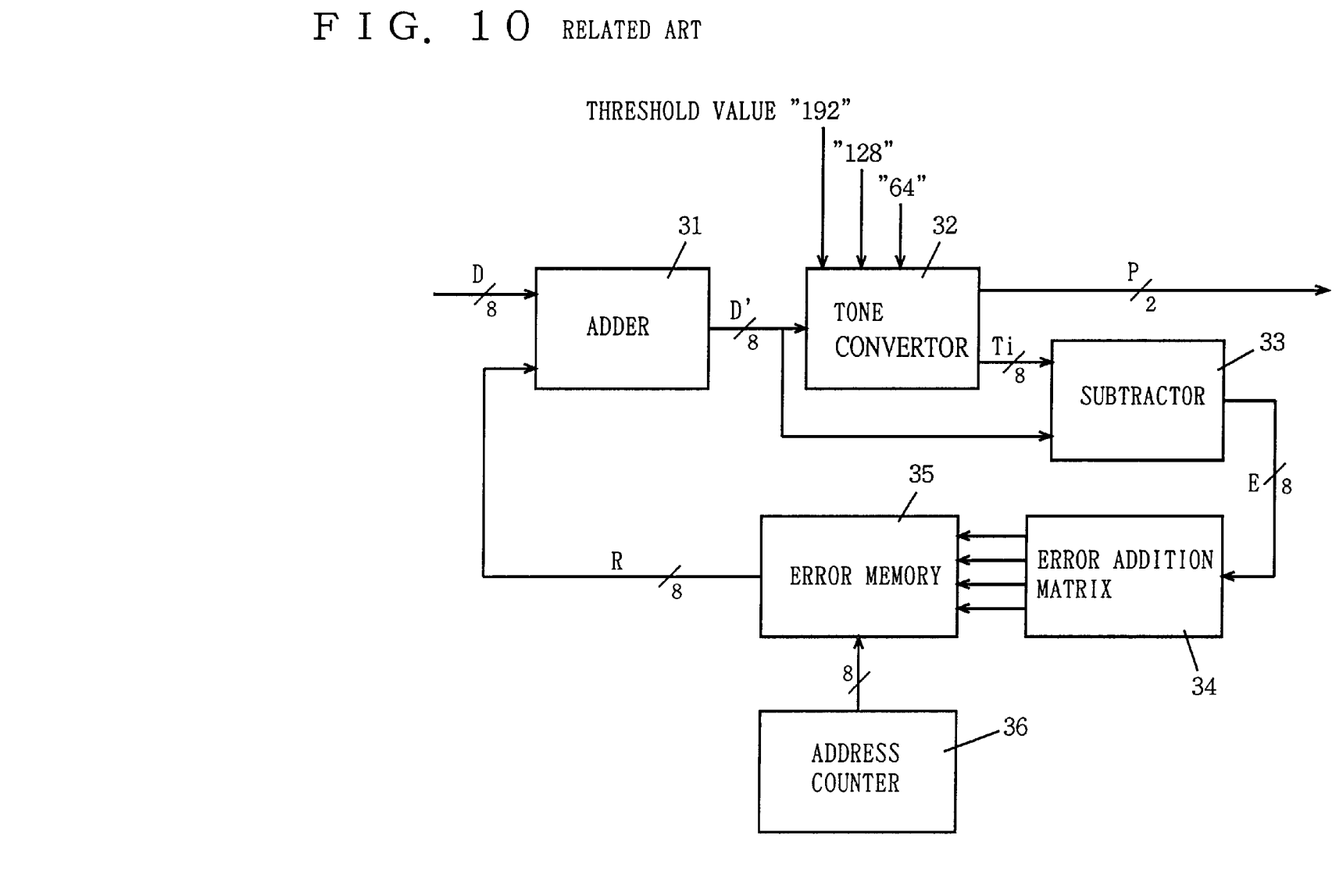
FIG. 10 is a block diagram showing a structure of a related error diffusion process circuit.

FIG. 10 is a block diagram showing a structure of a conventional multi-value error diffusion process circuit.

Referring to FIG. 10, the multi-value error diffusion process circuit includes an adder 31, a tone convertor 32, a subtractor 33, an error addition matrix 34, an error memory 35, and an address counter 36.

Adder 31 adds a pixel density D (8 bits) of a pixel of interest (the pixel that is the subject of process) with a correction value R to output a corrected pixel density D' (8 bits).

Figure 11A:
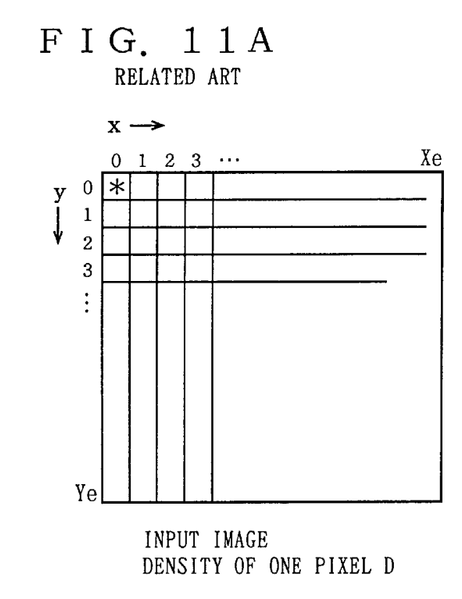
FIGS. 11A–11C are diagrams for describing relationship between input data and output data of adder 31 of FIG. 10.

More specifically, as shown in FIG. 11A, the image (digital data) applied to the multi-value error diffusion process circuit is formed of pixels 0-Xe in the x direction and pixels 0-Ye in the y direction. The pixel of interest is indicated by * in the drawing. Density D of the pixel of interest is applied to adder 31. Image process is carried out by scanning the pixel of interest in the input image.

Figure 11B:
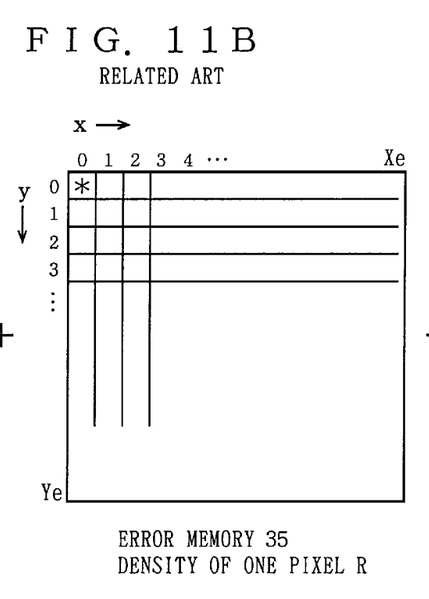

Error memory 35 is formed of a plurality of pixels identical in number to the pixels of the input image as shown in FIG. 11B. Address counter 36 designates a pixel in error memory 35 located at a position identical to the position of the pixel of interest.

Figure 11C:
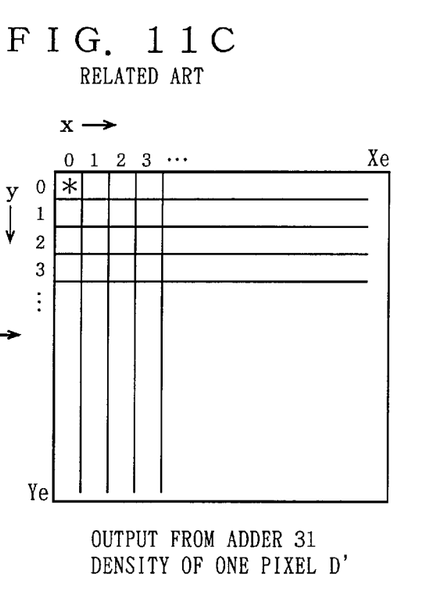

In adder 31, density D of the pixel of interest is added with the density (correction value R) of the pixel in error memory 35 designated by address counter 36. Corrected pixel density D' is output from adder 31 as shown in FIG. 11C.

Tone convertor 32 converts the 8-bit converted pixel density D' using a threshold value to output a 2-bit converted pixel density P. Tone convertor 32 also provides a data selector output Ti used for error computation at the same time. This data selector output Ti will be described afterwards.

Subtractor 33 subtracts data selector output Ti from corrected pixel density D' to output the obtained value as error E.

Error addition matrix 34 distributes error E to the pixels around the pixel of interest in error memory 35. Error memory 35 adds and stores the error for each pixel.

Error memory 35 provides the error of the addressed pixel designated by address counter 36 as correction value R.

The multi-value error diffusion process is completed by manipulating the pixel of interest in one image to alter pixel density D for all the pixels into converted pixel density P.

Figure 12:
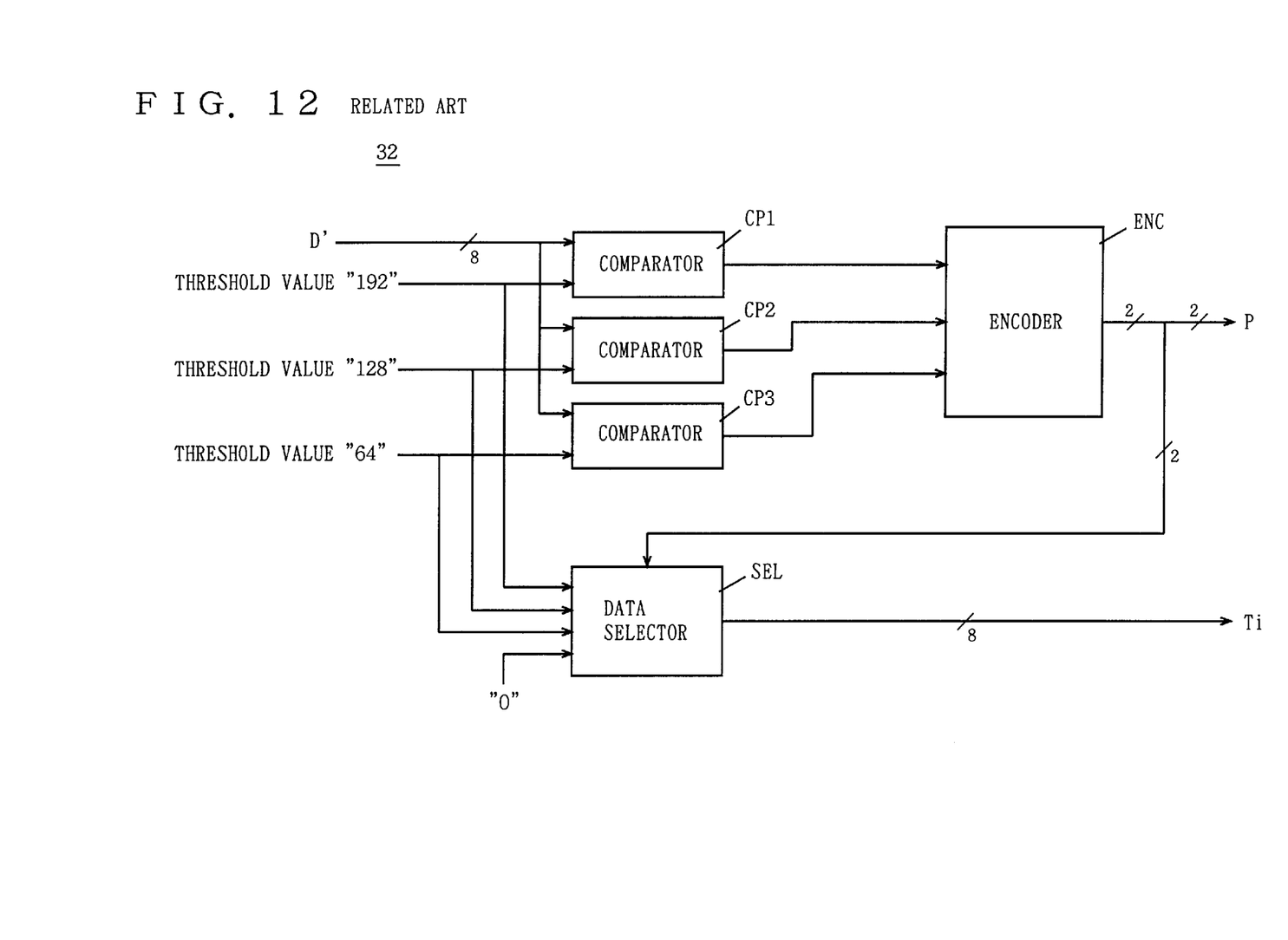
FIG. 12 is a block diagram showing a structure of a tone convertor 32 of FIG. 10.

FIG. 12 is a block diagram showing a structure of tone convertor 32 of FIG. 10.

Referring to FIG. 12, tone convertor 32 includes comparators CP1–CP3, an encoder ENC for adding the output of the comparator, and a data selector SEL for providing one threshold value or "0".

Comparator CP1 compares corrected pixel density D' with a threshold value 192. When D'≧192, 1 is output. When D'<192, 0 is output.

Comparator CP2 compares corrected pixel data D' with a threshold value 128. When D'≧128, 1 is output. When D'<128, 0 is output.

Comparator CP3 compares corrected pixel density D' with a threshold value 64. When D'≧64, 1 is output. When D'<64, 0 is output.

Encoder ENC adds the outputs of comparators CP1–CP3 to provide a converted pixel density P.

Data selector SEL selects any of the threshold values of 64, 128, and 192 or 0 according to converted pixel density P output from encoder ENC. The selected value is provided as data selector output Ti.

Figure 13:
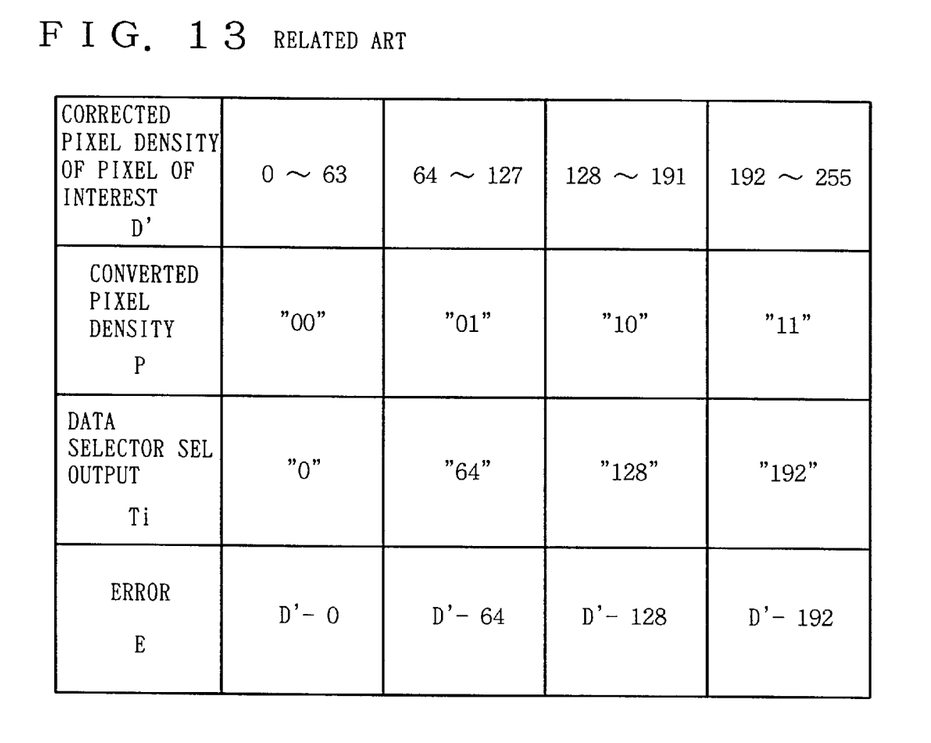
FIG. 13 shows the relationship of corrected pixel density data D', converted pixel density P, data selector output Ti, and error E of the circuit of FIG. 10.

FIG. 13 shows the relationship of corrected pixel density D', converted pixel density P, data selector output Ti, and error E.

When the value of corrected pixel density D' is 0–63, converted pixel density P is 00. Here, data selector output Ti is 0. Therefore, the value of D'–0 is output from subtractor 33 as error E.

When the value of corrected pixel density D' is 64–127, converted pixel density P is 01. Here, data selector output Ti is 64. Therefore, the value of D'–64 is output from subtractor 33 as error E.

When the value of corrected pixel density D' is 128–191, converted pixel density P is 10. Here, data selector output Ti is 128. Therefore, the value of D'–128 is output from subtractor 33 as error E.

When the value of corrected pixel density D' is 192–256, converted pixel density P is 11. Here, data selector output Ti is 192. Therefore, the value of D'–192 is output from subtractor 33 as error E.

Figure 14:
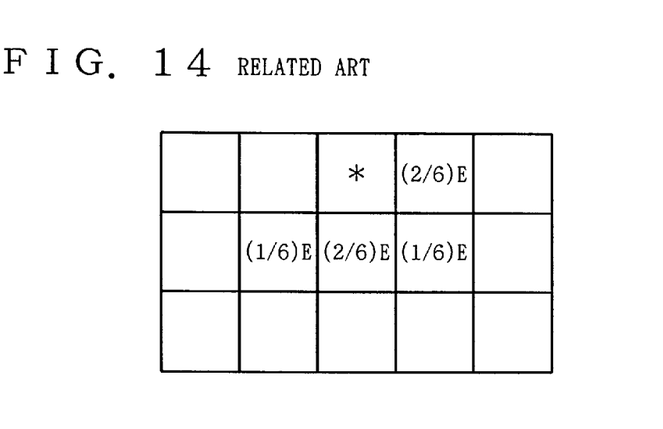
FIG. 14 is a diagram for describing the process carried out by error addition matrix 34 of FIG. 10.

Error addition matrix 34 adds error E generated by the tone conversion of the pixel of interest to the pixels around the pixel of interest in error memory 35. More specifically, as shown in FIG. 14, error E of 1/6 generated by the tone conversion of the pixel of interest (*) is added to the two pixels in error memory 35 located below and to the left and right of the pixel of interest.

Error E of 2/6 is added to the two pixels located rightward and below the pixel of interest. Error diffusion is carried out in this way.

By using a multi-value error diffusion process circuit of the above-described structure, a pseudo tone can be applied on the image output. Furthermore, by providing the output data in a plurality of bits by each pixel, the tone gradation of the output data becomes more gentle than that of a binary output.

However, the conventional multi-value error diffusion process circuit had the disadvantage that the quality of the image data is degraded since the entire original document is subjected to the error diffusion process with a predetermined threshold value. For example, when there is a halftone image of uniform density in the original data such as halftone density text and that uniform density differs from the predetermined threshold value, data resolution is reduced to degrade the picture quality of the image.

When the error diffusion process is applied on the read out image data corresponding to halftone density text, the error is overlapped also on the text portion to degrade the picture quality of the text character. It may be desirable to not apply an error diffusion process in such a case. However, for original documents mixed with text characters and pictures, a better output may be obtained when the error diffusion process is applied.

SUMMARY OF THE INVENTION

An object of the present invention is to provide an image processing apparatus that can carry out an error diffusion process without degrading the quality of image data.

Another object of the present invention is to provide an image processing apparatus that does not have the quality of text of halftone density degraded even when an error diffusion process is applied.

According to an aspect of the present invention, an image processing apparatus includes a reception unit for receiving image data represented in M gray levels, a detection unit for detecting image data having halftone density from the received image data, a set unit for setting a reference density used in an error diffusion process according to the detected image data, and a conversion unit to apply the error diffusion process on the received image data using the set reference density for converting the image data into image data of $N(2<N<M)$ gray levels.

According to another aspect of the present invention, an image processing apparatus for converting image data represented by M gray levels into image data of $N(2<N<M)$ gray levels using an error diffusion process includes a detection unit for detecting density distribution of each pixel of the image data, and a set unit for setting the density of the greatest distribution as a reference density used in the error diffusion process as a result of the detection.

According to a further aspect of the present invention, an image processing apparatus includes a reader unit for reading out an original document image for generating image data, a detection unit for detecting particular density data according to the readout image data, a set unit for setting the detected density data as reference density data used in a multi-value error diffusion process, and a process unit for applying the multi-value error diffusion process on the readout image data using the set reference density.

According to still another aspect of the present invention, an image processing apparatus for converting image data represented by M gray levels into image data of $N(2<N<M)$ gray levels using an error diffusion process includes a detection unit for detecting from the image data represented by M gray levels particular density data according to the image data thereof, and a set unit for setting the detected particular density data as a reference density used in the error diffusion process.

According to a still further aspect of the present invention, an image processing method includes the steps of receiving image data obtained by reading an original document image, detecting from the received image data particular density data according to the image data thereof, setting the detected density data as a reference density used in a multi-value error diffusion process, and applying the multi-value error diffusion process on the read image data using the set reference density.

According to the present invention, the threshold value used in a multi-value error diffusion process is set from the density value of halftone text and halftone image data in the original document data. Therefore, halftone text and image can be represented continuously with the density identical to that of the original document data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
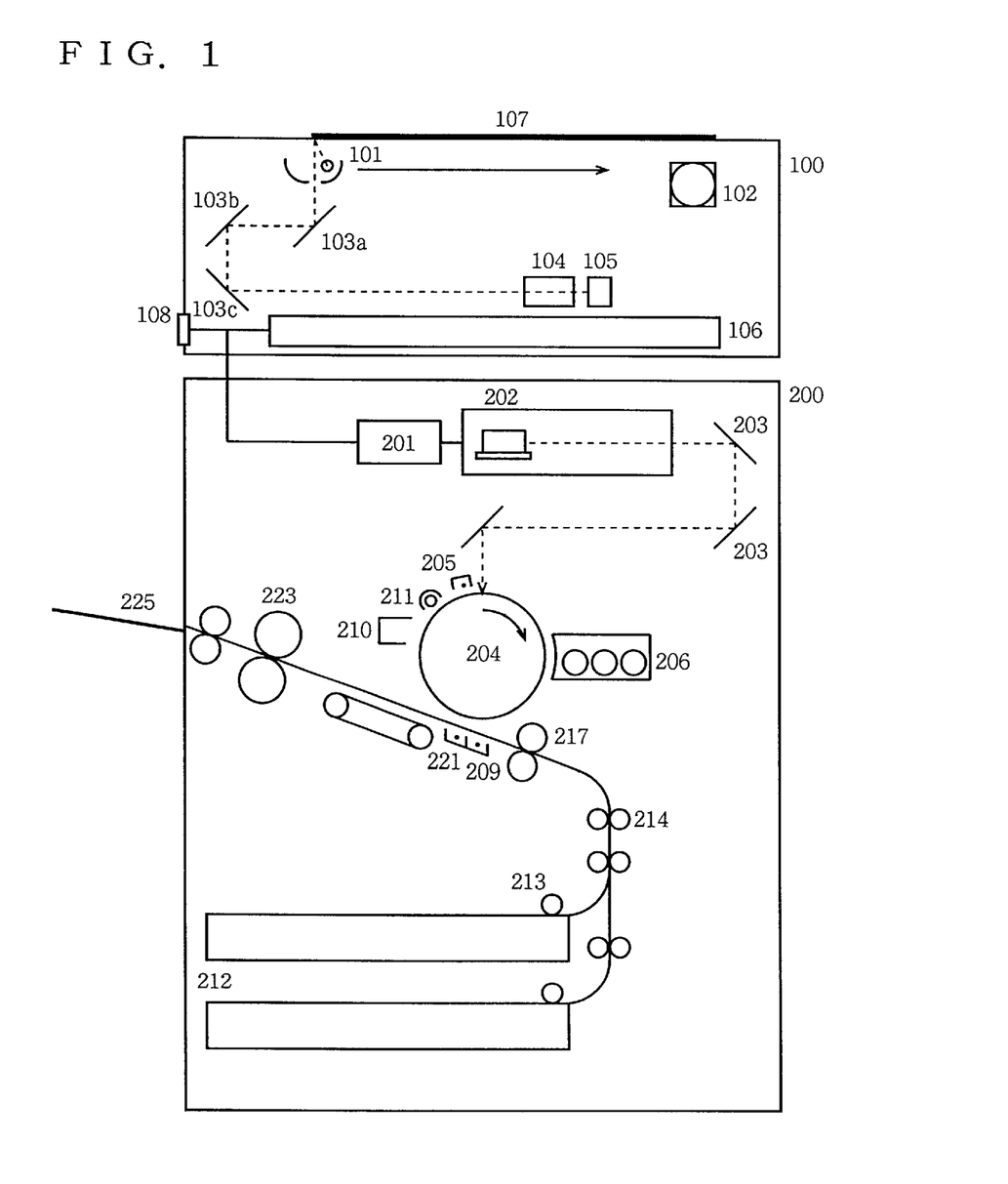
FIG. 1 shows a structure of a digital copy machine according to an embodiment of the present invention.

Referring to FIG. 1, a digital copy machine (image processing apparatus) of an embodiment of the present invention includes an image reader 100 and a printer 200. In general, image data read out by image reader 100 is provided to printer 200, whereby an image is formed to achieve the copy function.

Since connection with an external device is allowed through an interface 108, an image can be formed by providing the data read out by image reader 100 to an external device, or by transmitting image data from an external device to printer 200.

<Image Reader 100>

Light reflected from the original document placed on a platen glass 107 irradiated with an exposure lamp 101 is directed to a lens 104 by three mirrors 103a, 103b and 103c to form an image at a CCD sensor 105.

Exposure lamp 101 and mirror 103a are driven by a scanner motor 102 in the direction indicated by the arrow at a velocity v according to the magnification scale. Accordingly, the document on platen glass 107 can be scanned entirely. Mirrors 103b and 103c are driven in the direction indicated by the arrow at a velocity v/2 according to the scanning operation by exposure lamp 101 and mirror 103a.

The light reflected from the document entering CCD sensor 105 is converted into an electric signal within the sensor. The electric signal is subjected to an analog process, A/D conversion, and a digital image process by an image processing unit 106 to be sent to interface 108 or printer 200.

<Printer 200>

[Exposure]

Various elements are arranged in printer 200 with an exposure head 202 and a photoconductor 204 as the main elements.

Image data sent from image reader 100 or interface 108 is subjected to a correction process such as γ correction by an image data correction unit 201. The processed data is sent to exposure head 202. Exposure head 202 emits laser according to the electric signal of the received image data. The light thereof is provided for linear scanning by a polygon mirror to arrive at photoconductor 204 through a mirror pair 203.

[Photoconductor Neighborhood]

Elements for carrying out an electrophotographic process are arranged at the periphery of photoconductor 204. Photoconductor 204 rotates clockwise in the drawing to effect each process continuously.

First, photoconductor 204 is charged by a corona charger 205. The charged photoconductor 205 is exposed by laser light. The emitted laser light becomes brighter as the image data has a higher density. The charge on photoconductor 205 is removed by the laser. The removed area is developed by a developing device 206. The toner image formed on photoconductor 204 is transferred onto a sheet by a transfer charger 209. Photoconductor 204 has the unnecessary toner removed by a cleaner 210, and then discharged again by a main eraser 211 to prepare for a subsequent process.

In an electrophotographic process, the one routine of the processes of charging/exposure/develop/transfer/cleaning is repeatedly carried out for image formation. In a full color image, this process is carried out four times according to each color of development to produce a full color image.

[Sheet Feed/Transportation]

The sheet on which an image is to be transferred is supplied to a transfer belt according to the procedure set forth in the following to eventually form an output image. Sheets of various sizes. are set in the group of sheet feed cassette 212. The sheet of a desired size is supplied to the transportation path by a sheet feed roller 213 attached to each sheet feed cassette. The sheet fed to the transportation path is sent to a timing roller 217 by a transportation roller group 214.

[Transfer/Fixation]

Transfer charger 209 transfers the toner image formed on photoconductor 204 onto the sheet supplied from timing roller 217. When the tone image is transferred onto the sheet, a discharger 211 removes the charge from the sheet. As a result, the sheet is detached from photoconductor 204.

The tone image on the sheet detached from photoconductor 204 is heated by a fixation roller pair 223. The toner is fused to be fixed on the sheet. Then, the sheet is discharged on a discharge tray 225.

Figure 2:
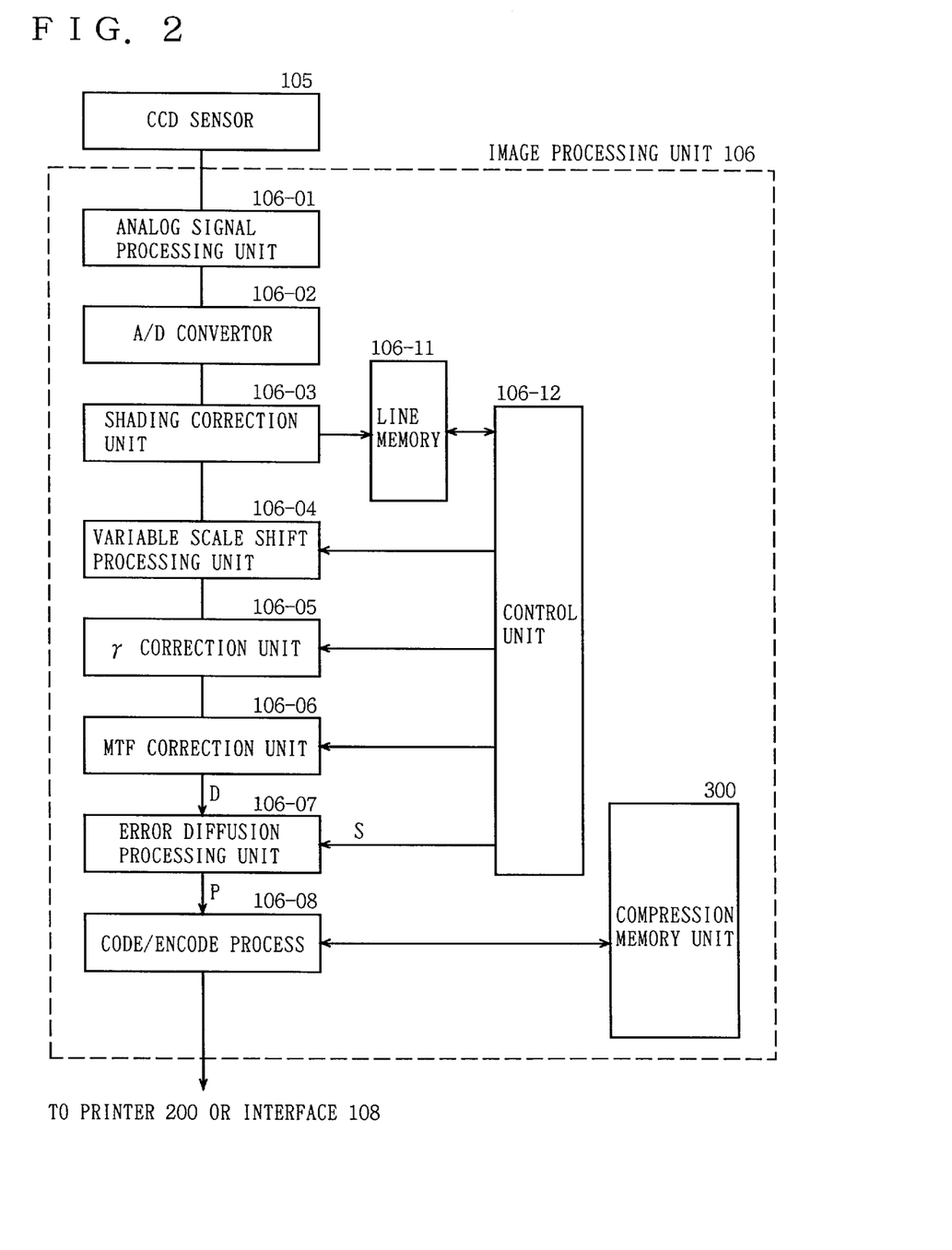
FIG. 2 is a block diagram showing a structure of an image processing unit 106 of FIG. 1.

Referring to FIG. 2, an image processing unit 106 includes an analog signal processing unit 106-01, an A/D conversion unit 106-02, a shading correction unit 106-03, a variable scale shift processing unit 106-04, a γ correction unit 106-05, a MTF correction unit 106-06, an error diffusion processing unit 106-07, a code/decode processing unit 106-08, a line memory 106-11, a control unit 106-12, and a compression memory unit 300.

The electric signal that is photo-converted by CCD sensor 105 is output as an analog signal proportional to the light reflected from the document.

The analog signal output from CCD sensor 105 is subjected to sample hold/amplify/clamp adjustment in analog signal processing unit 106-01.

The analog signal is converted into a digital signal by A/D conversion unit 106-02.

The digital signal data is subjected to a shading correction by shading correction unit 106-03 to remove any CCD chip unevenness.

The data subjected to the shading correction is temporarily stored in line memory 106-11. The parameters required for coding and image editing are calculated in control unit 106-12.

Then, a variable scale shift process is carried out by variable scale shift processing unit 106-04 to alter the output image size and print out position.

Then, γ correction is applied by γ correction unit 106-05 according to the entire tone property.

Also, spatial image correction such as edge enhancement is carried out by MTF correction unit 106-06.

Then, an error diffusion process is carried out, if necessary, by error diffusion processing unit 106-07. In the error diffusion process, pixel density D of the image data output from MTF correction unit 106-06 and a reference density S output from control unit 106-12 are used. Converted pixel density P of the image data subjected to an error diffusion process is output from error diffusion processing unit 106-07.

For the purpose of storing image data efficiently in compression memory unit 300, code/decode processing unit 106-08 codes image data or decodes image data in read out data from compression memory unit 300.

The image signal that is processed as described above is sent to printer 200 to be printed out or sent to interface 108 to be provided to an external device.

Figure 3:
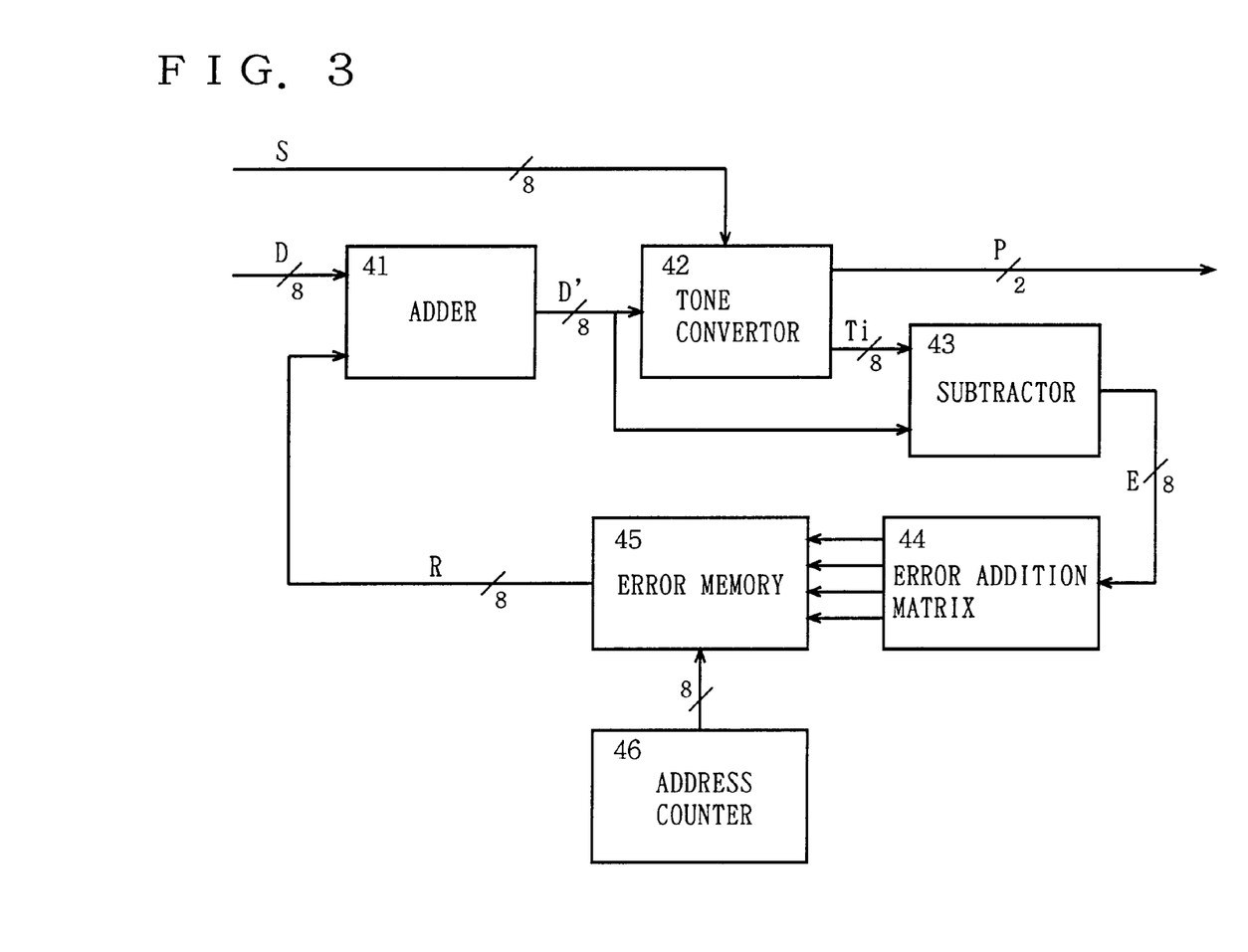
FIG. 3 is a block diagram showing a structure of an error diffusion processing unit 106-07 of FIG. 2.

FIG. 3 is a block diagram showing a structure of error diffusion processing unit 106-07 of FIG. 2.

Referring to FIG. 3, an error diffusion processing unit 106-07 includes an adder 41, a tone convertor 42, a subtractor 43, an error addition matrix 44, an error memory 45, and an address counter 46.

The function of respective blocks is similar to those described with reference to FIG. 10. Only differing portions will be described hereinafter.

Figure 4:
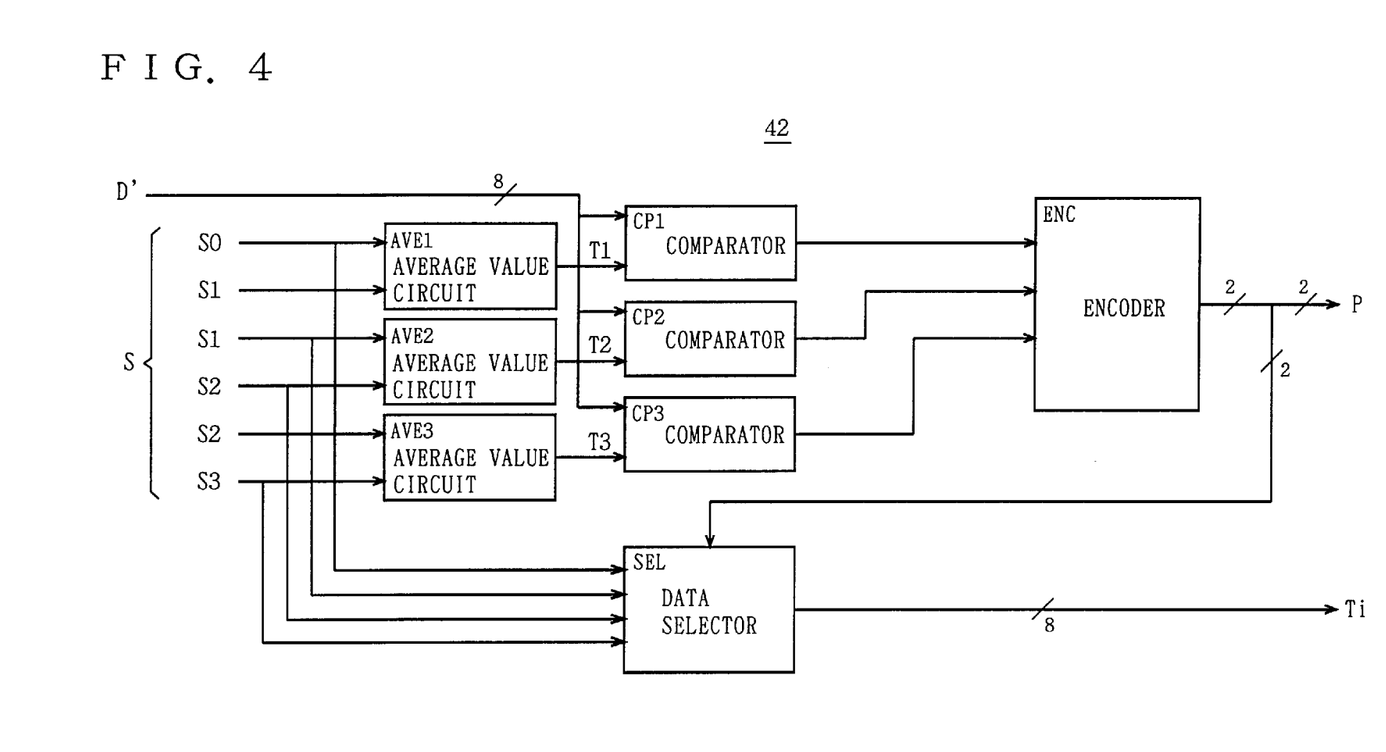
FIG. 4 is a block diagram showing a structure of a tone convertor 42 of FIG. 3.

FIG. 4 is a block diagram of tone convertor 42.

Referring to FIG. 4, tone convertor 42 includes average value circuits AVE1–AVE3, comparators CP1–CP3, a data selector SEL, and an encoder ENC.

A reference density S is applied to each of average value circuits AVE1–AVE3 and data selector SEL. Reference density S is formed of reference densities S0–S3.

Average value circuit AVE1 receives reference densities S0 and S1 to output the average value thereof as a threshold value T1.

Average value circuit AVE2 receives reference densities S1 and S2 to output the average value thereof as a threshold value T2.

Average value circuit AVE3 receives reference densities S2 and S3 to output the average value thereof as a threshold value T3.

Comparator CP1 compares converted pixel density D' output from adder 41 with threshold value T1. When D'≧T1, 1 is output to encoder ENC. When D'<T1, 0 is output to encoder ENC.

Comparator CP2 compares converted pixel density D' with threshold value T2. When D'≧T2, 1 is output to encoder ENC. When D'<T2, 0 is output to encoder ENC.

Comparator CP3 compares converted pixel density D' with threshold value T3. When D'>T3, 1 is output to encoder ENC. When D'<T3, 0 is output to encoder ENC.

Encoder ENC adds the outputs from comparators CP1–CP3 to output a converted pixel density P.

Data selector SEL responds to output P from encoder ENC to output any one of reference densities S0, S1, S2, and S3 as data selector output Ti.

The image processing apparatus of the present embodiment is characterized in that the values of reference densities S1 and S2 are altered according to the density histogram of the input image data.

Figure 5:
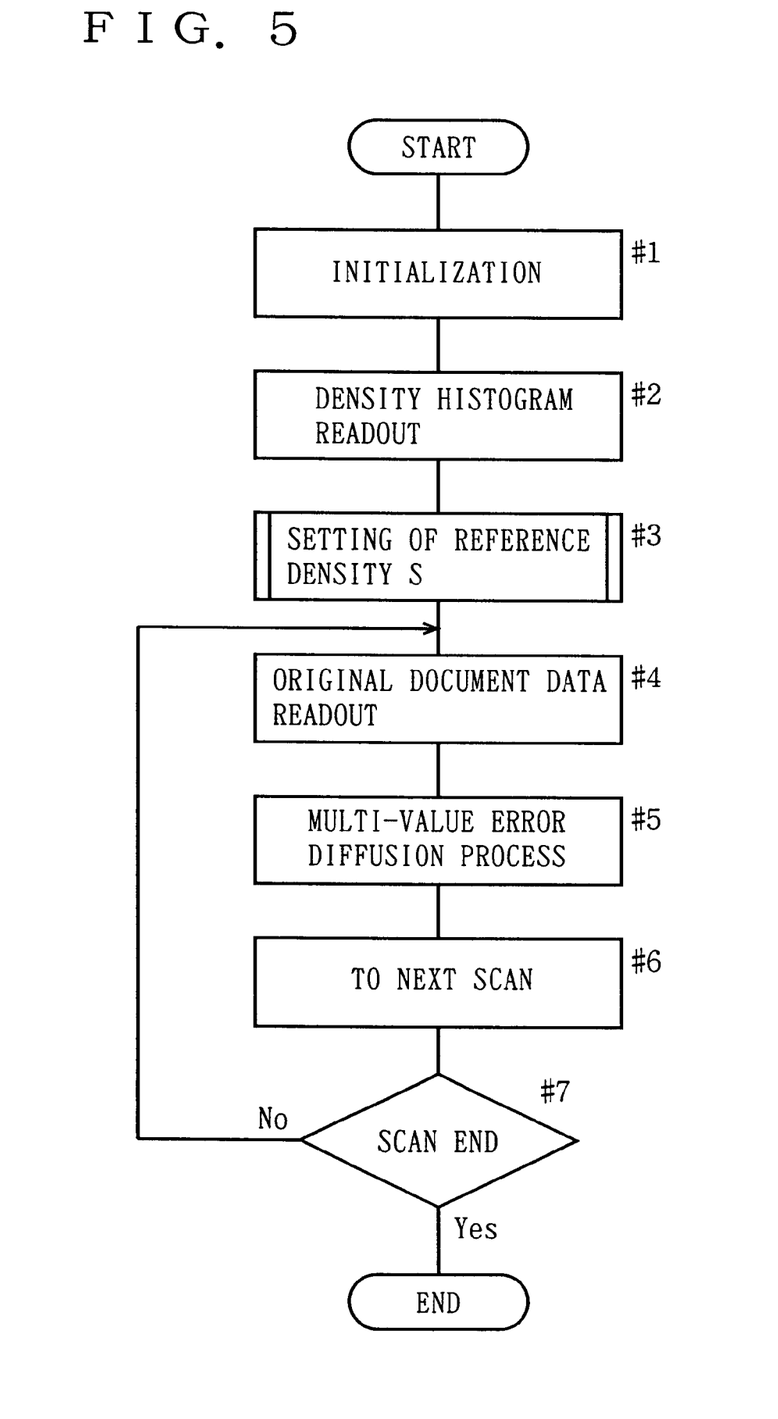
FIG. 5 is a flow chart of an error diffusion process carried out by the digital copy machine of FIG. 1.

FIG. 5 is a flow chart showing the image processing operation carried out by the copy machine of the present embodiment.

Referring to FIG. 5, initialization is carried out at step #1. At step #2, the obtained original document image is scanned to produce a density histogram.

Figure 7:
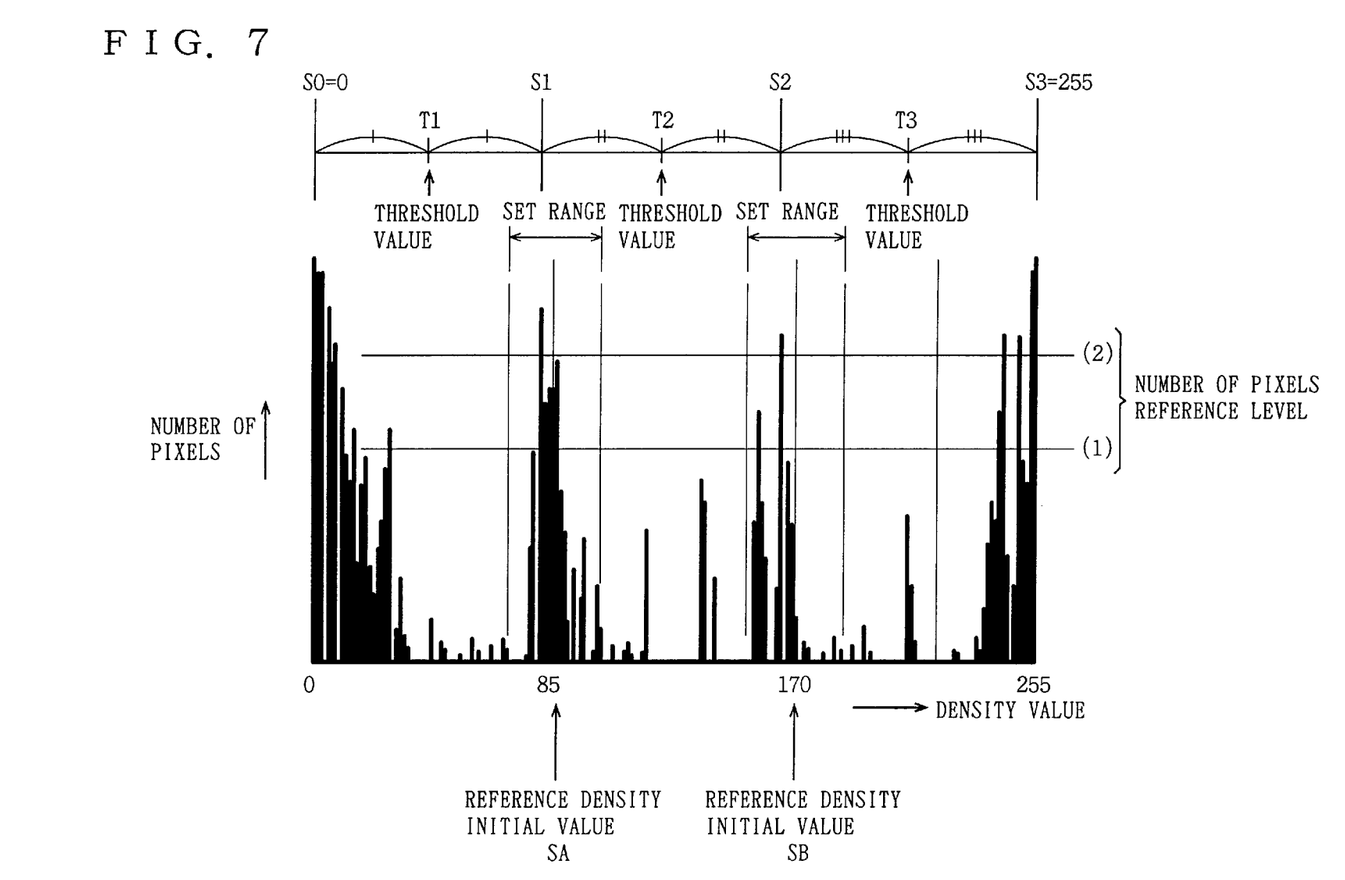
FIG. 7 shows a specific example of a density histogram.

FIG. 7 shows a specific example of a density histogram. In FIG. 7, the pixel density value is plotted along the horizontal axis (0–255), and the number of pixels of that density is plotted along the vertical axis.

At step #3, a reference density which is the pixel density for setting the threshold value used in the multi-value error diffusion process is set from the obtained density histogram. The number of reference densities set corresponds to the output gray levels.

At step #4, the document image data (pixel density) of the pixel of interest is read out. At step #5, a threshold value is obtained from the reference density set at step #3. The error diffusion process is carried out using the obtained threshold value.

At step #6, the next pixel of interest is scanned. At step #7, determination is made whether all the pixels have been scanned. When NO at step #7, the process from step #4 is repeatedly carried out.

Figure 6:
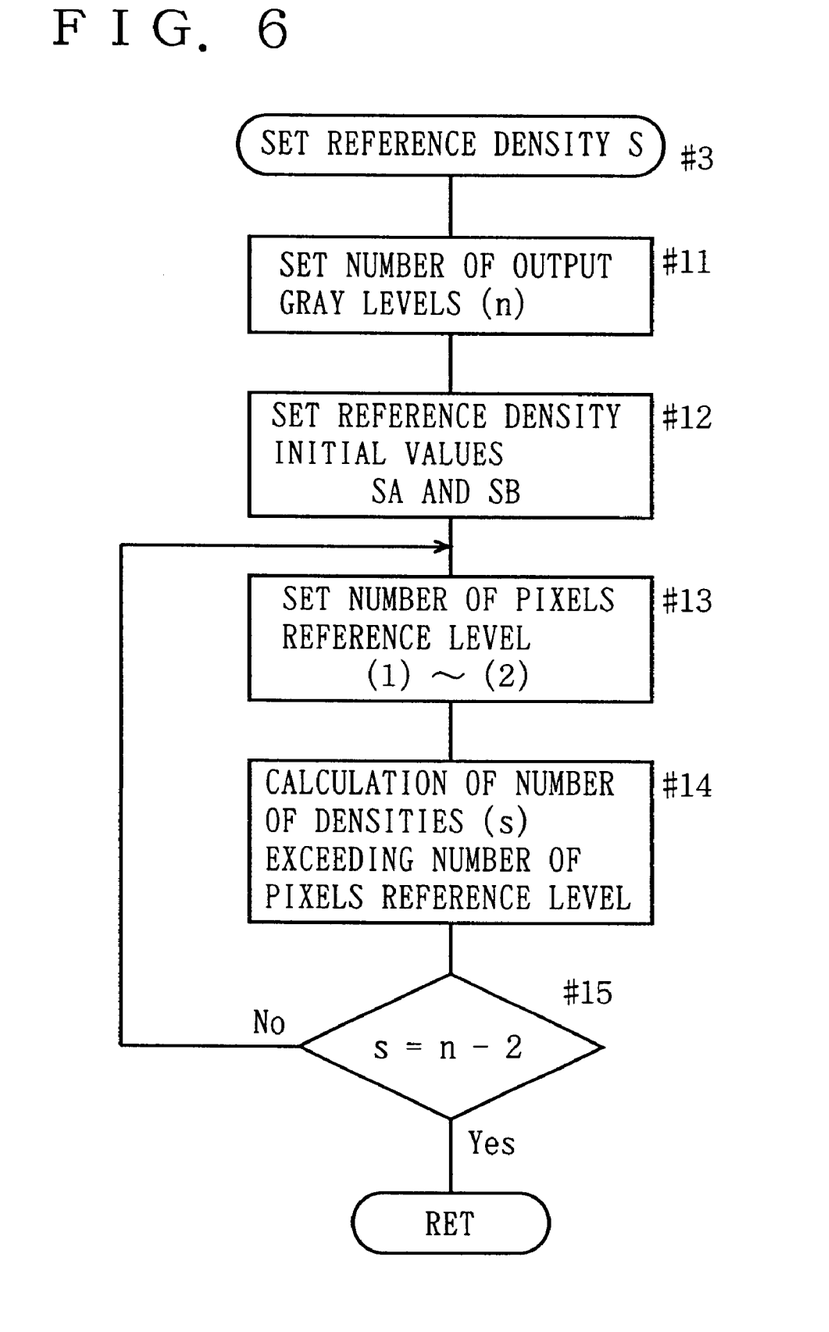
FIG. 6 is a flow chart of the subroutine of the reference density set process (#3) of FIG. 5.

FIG. 6 is a flow chart of the reference density set process (#3).

At step #11, the number of output gray levels n is set according to the information from the output device or from arbitrary information set by the user. In the present embodiment, the number of output gray levels n=4 is set.

At step #12, the reference density initial value (SA, SB in FIG. 7) is calculated according to the number of output gray levels n. The reference density initial value is the density located at the boundary when the 256 gray levels is equally divided into (n-1). When the number of output gray levels n=4, the density values of 85 and 170 at respective boundaries when the 256 gray levels is equally divided into three are the reference density initial values SA and SB. The range from the reference density initial value to a predetermined density is the range to set the reference density (refer to FIG. 7).

At step #13, the number of pixels reference level (in FIG. 7, (1) or (2)) is set. This number of pixels reference level is the level to determine whether the number of pixels is great or small. The density of the pixels within the set range that are greater than the number of pixels set by the number of pixels reference level is taken as the reference density.

Here, one reference density is required for each set range. In order to determine that there is one reference density in each set range, determination is made at step #14 of how many density values there are in the set range corresponding to pixels exceeding the number of pixels reference level. This number of density values is indicated as "s" hereinafter.

Then, determination is made whether s=n–2. More specifically, the setting process for the reference density is terminated when s=n–2, and the number of pixels reference level is set newly at step #13 when not s=n–2, since there must be only one particular reference value in each set range for n number of output gray levels.

More specifically, when the number of density values s is larger than n–2, the number of pixels reference level is gradually raised by a constant level. When the number of densities s is smaller than n–2, the number of pixels reference level is reduced by a constant level.

When the level exceeds a certain level as a result of raising the number of pixels reference level, the reference density is set as the reference density initial value. Alternatively, binary output can be employed without setting a reference density.

Similarly in the case where the level becomes lower than a constant level as a result of reducing the number of pixels reference level, the reference density is set as the reference density initial value, or the input image is output in a binary manner.

In the example shown in FIG. 7, s=n–2 when the number of pixels reference level is raised from (1) to (2). Density values S1 and S2 in the set range are taken as the reference density.

Reference densities S1 and S2 set as described above and S0 (=0) and S3 (=255) which are the lower limit value and upper limit value, respectively, of the density value are applied to average value circuits AVE1–AVE3 and data selector SEL as shown in FIG. 4. Threshold values T1–T3 are calculated by averaging the reference densities in average value circuits AVE1–AVE3. According to threshold values T1–T3, corrected pixel density D' is compared in comparators CP1–CP3. The result of the comparison is provided to encoder ENC.

Figure 8:
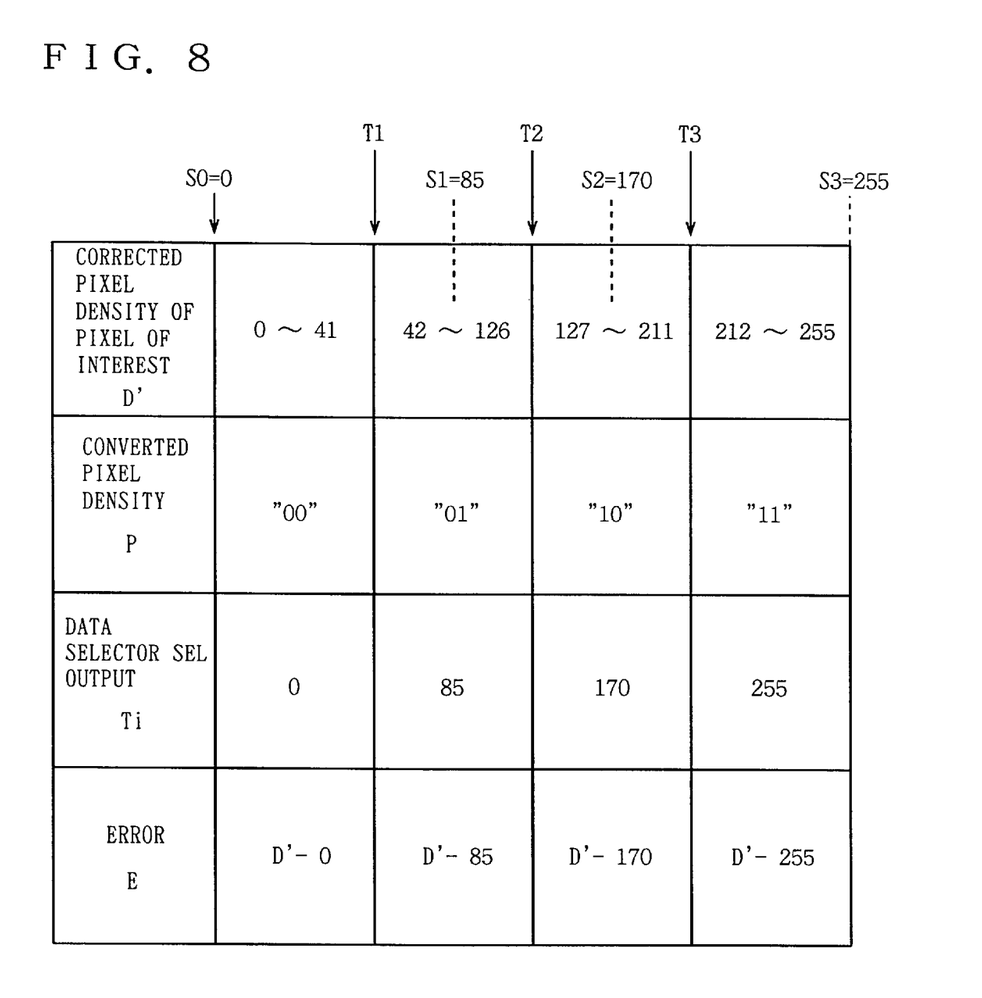
FIG. 8 shows the relationship of corrected pixel density D', converted pixel density P, data selector output Ti, and error E.

FIG. 8 is a list showing the relationship of corrected pixel density D', converted pixel density P output from encoder ENC, output Ti of data selector SEL, and error E output from subtractor 43 of the pixel of interest when reference density S1 is 85 and reference density S2 is 170.

Referring to FIG. 8, the threshold values are T1=42, T2=127, and T3=212 since the reference densities are S0=0, S1=85, S2=170, and S3=255. Therefore, converted pixel density P is 00 when corrected pixel density D' is 0~41. Here, the value of S0, i.e., 0, is provided as output Ti of data selector SEL. Therefore, error E output from subtractor 43 is D'–0.

When the value of corrected pixel density D' is 42~126, converted pixel density P output from encoder ENC becomes 01. Output Ti of data selector SEL takes the value of S1, i.e., 85. Therefore, error E output from subtractor 43 takes the value D'–85.

When the value of corrected pixel density D' is 127~211, converted pixel density P is 10. Output Ti is 170, corresponding to the value of S2. Therefore, error E is D'–170.

When the value of corrected pixel density D' is 212~255, converted pixel density P is 11. Output Ti is 255, corresponding to the value of S3. Therefore, error E is D'–255.

Figure 9A:
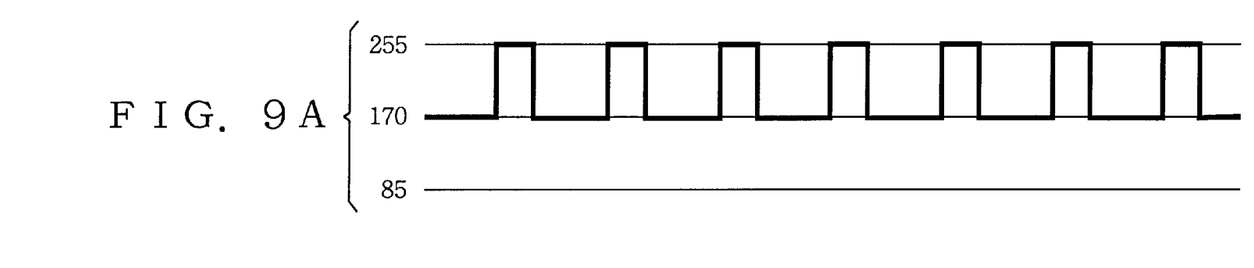
FIGS. 9A–9C are diagrams for describing the advantage of the digital copy machine of the present invention.
Figure 9B:
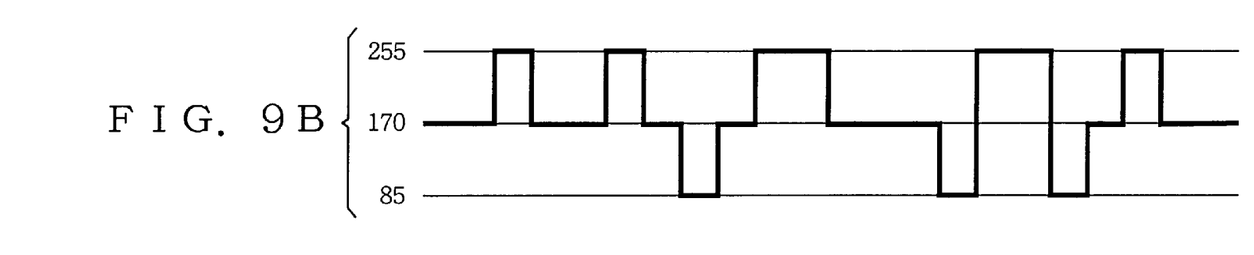
Figure 9C:
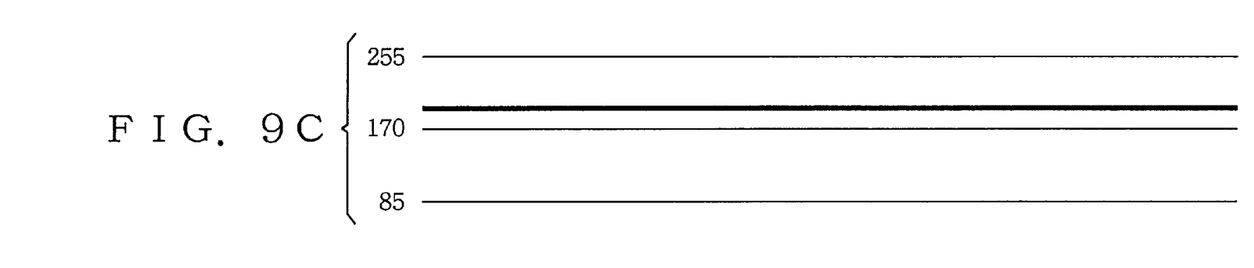

FIGS. 9A–9C are diagrams for describing the advantage of the image processing apparatus of the present embodiment.

It is assumed that the input image data is halftone density data having a constant density value of 180. FIG. 9A shows the result when the general multi-value error diffusion process of conventional art is applied.

In the normal multi-value error diffusion process, the density value repeats the amplitude between 170 and 255 at a constant cycle since the halftone density is to be represented in a pseudo manner. In the conventional art, the halftone density is not output at a uniform density. Also, moire is generated due to the periodical pattern output.

FIG. 9B shows the processed result when the amount of the threshold value is altered randomly or periodically aiming to alleviate generation of moire in a multi-value error diffusion process. It is appreciated that the halftone density is represented as a periodic transition among 170, 255, or 85.

FIG. 9C shows the output by the image processing apparatus of the present embodiment. The threshold value is altered according to the density when the halftone density is present in the set range. Therefore, no error is generated between the input image data and the output image data. As a result, the image can be output at a uniform density. The example of FIG. 9C has the reference density set as 180.

According to the present embodiment, an error diffusion process can be carried out without degrading the quality of the image data. The quality of an image with halftone density (for example, halftone density text) will not be degraded even when an error diffusion process is applied.

Although the reference density is defined within the set range in the present embodiment, the set range can be adjusted when the threshold value is set.

Also, different number of pixels reference level can be different for each set range. Furthermore, the pixel of a particular density can be enhanced or the number of out gray levels can be adjusted by intentionally altering the condition for setting the threshold value (for example, by arbitrary setting by user).

In the present embodiment, the number of output gray levels is set as 4, and the number of reference densities to be set is 2. However, the present invention can be embodied if the set reference density is n−2 where n is the number of output gray levels.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   reception means for receiving image data represented in M gray levels;
   detection means for detecting gray levels of the received image data;
   set means for setting reference densities used to classify said detected gray levels into one of N output values, when 2<N<M, according to the detected image density data; and
   conversion means to apply an error diffusion process on the received image data using said set reference densities for converting the image data into image data of N gray levels.

2. The image processing apparatus according to claim 1, wherein said image data having the gray levels is density data with a maximum number of pixels.

3. The image processing apparatus according to claim 2, wherein said density data is determined from a density histogram according to the image data.

4. The image processing method according to claim 1, wherein the reference density is unique for each image.

5. An image processing apparatus for converting image data represented in M gray levels into image data of N (2<N<M) gray levels using an error diffusion process, said image processing apparatus comprising:
   detection means for detecting density distribution of each pixel from said image data; and
   set means for setting a density having the greatest distribution as reference densities for threshold values used in the error diffusion process to distinguish between said N gray levels as a result of detection by said detection means.

6. The image processing apparatus according to claim 5, wherein said set means comprises initial value set means for setting a reference density initial value,
   range set means for setting a predetermined range including said reference density initial value, and
   determination means for determining image data most frequent in said predetermined range as density data.

7. The image processing apparatus according to claim 6, wherein (N−2) of said reference density initial values are set in a halftone region.

8. The image processing apparatus according to claim 6, wherein said reference density initial value is used as the reference density when the number of said image data most frequent in said predetermined range is smaller than a predetermined value.

9. The image processing apparatus according to claim 8, wherein said predetermined value can be modified.

10. The image processing method according to claim 5, wherein the reference density is unique for each image.

11. An image processing apparatus comprising:
    reader means for reading an original document image for generating image data;
    detection means for detecting from said read image data particular density data according to image data thereof;
    set means for setting said detected density data as reference density data for discriminating between different output levels in a multi-value error diffusion process; and
    process means for applying the multi-value error diffusion process on said read image data using said set reference density data.

12. The image processing apparatus according to claim 11, wherein said reader means generates image data of M gray levels, and
    wherein said process means converts image data of M gray levels into data of N(2<N<M) gray levels.

13. The image processing apparatus according to claim 12, wherein said detection means detects (N−2) of said density data.

14. The image processing apparatus according to claim 13, wherein said particular density data detected by said detection means is a peak value in a density histogram of image data.

15. The image processing method according to claim 11, wherein the reference density data is unique for each original document image.

16. An image processing apparatus for converting image data represented in M gray levels into image data of N (2<N<M)) gray levels using an error diffusion process, said image processing apparatus comprising:

detection means for detecting particular density data from said image data represented in M gray levels according to the image data thereof; and set means for setting said detected particular density data as reference densities used to discriminate between different output levels in the error diffusion process.

17. The image processing apparatus according to claim 16, wherein said detection means detects said particular density data from a density histogram according image data.

18. The image processing apparatus according to claim 17, wherein said particular density data is a peak value of said density histogram.

19. The image processing apparatus according to claim 16, wherein said detection means comprises means for setting (N−2) predetermined density ranges, and means for determining image data most frequent in each of said predetermined density ranges as said particular density data.

20. The image processing method according to claim 16, wherein the reference density is unique for each image.

21. An image processing method comprising the steps of:

receiving image data obtained by reading out an original document image;

detecting particular density data from said received image data according to image data thereof;

setting said detected density data as reference density data for threshold values used in a multi-value error diffusion process; and applying the multi-value error diffusion process on said read image data using said set reference density data.

22. The image processing apparatus according to claim 21, wherein said particular density data is detected from a density histogram according to image data.

23. The image processing method according to claim 22, wherein said particular density data is a peak value of said density histogram.

24. The image processing method according to claim 21, wherein the reference density data is unique for each original document image.

* * * * *